INVENTOR
ALBERT E. ANDERSON
BY
Sandoe, Hopgood and Calimafde
ATTORNEYS

United States Patent Office 3,810,808
Patented May 14, 1974

3,810,808
APPARATUS FOR MAKING PLASTIC
SHEET MATERIAL
Albert E. Anderson, Norwich, Conn., assignor to Pervel
Industries, Inc., Plainfield, Conn.
Original application Apr. 12, 1968, Ser. No. 721,002, now
Patent No. 3,607,493. Divided and this application
Sept. 16, 1971, Ser. No. 181,114
Int. Cl. B32b 3/00
U.S. Cl. 156—389                                3 Claims

ABSTRACT OF THE DISCLOSURE

The invention contemplates apparatus for manufacture of expanded-plastic sheet material, wherein an outer skin is removed by heat-skiving, to present a velvety texture. The apparatus uses a heated drum to impart a temperature gradient in the region of skin to be removed. The apparatus produces a product which is directly usable, or the product may be further processed to add a special outer skin. In the latter case, the heat-skiving function of the apparatus is found to impart richness to the "feel" of the product.

---

This application is a division of my copending application, Ser. No. 721,002, filed Apr. 12, 1968, now U.S. Pat. No. 3,607,493.

This invention relates to plastic-coated fabric, with a skin surface on a layer of expanded plastic.

According to present techniques for making coated fabrics of the character indicated, a liquid plastic is first applied as a coat or casting to a so-called release paper, which is the basic vehicle for conveying a web through a continuous process. Having sufficiently cured this plastic coat, to make a skin, a coating of expandable plastic is next applied. The expandable plastic is partially cured, to the point of "tackiness," whereupon a reinforcing back or base of fabric material is laminated to the tacky material. Plastic expansion then proceeds to completion, bonding the fabric base to the expanded plastic. The release paper is then stripped, and the finished product is embossed and wound for storage or shipment.

The described process is beset with several important limitations and is relatively expensive.

It is, accordingly, an object of the invention to provide an improved product, method and apparatus of the character indicated.

It is another object to meet the above object with a more firmly adhering and more rugged surface or skin than heretofore.

Another object is to provide greater flexibility in the manufacture of different surface contouring or texture.

It is a specific object to provide an improved method and means for laminating calendered plastic film to an expanded-plastic layer.

Another specific object is to provide an improved method and means for conditioning an expanded-plastic lamination for bonding to another layer or surface.

A still further specific object is to provide a method and apparatus for refinishing fabric of the character indicated.

It is a general object to meet the above objects with a product of improved quality and producible at less expense.

Other objects and various further features of novelty and invention will be pointed out or will occur to those skilled in the art from a reading of the following specification in conjunction with the accompanying drawings. In said drawings, which show, for illustrative purposes only, a preferred form and method of the invention:

FIGS. 4 to 7 are enlarged, fragmentary, sectional views illustrating steps in the construction of a plastic-coated fabric of the invention.

Briefly stated, the invention contemplates improved plastic-coated fabrics wherein the exposed surface is a special skin over a layer of expanded plastic, thus imparting richness to the "feel" of the product. In making this product, the customary release sheet is first removed, and then a layer of plastic skin is stripped from the expanded-plastic layer, so as to expose the pocked character of the expanded plastic; the voids and interstices of this pocked surface are utilized for strikingly effective bonding of a separate skin layer, which may be and preferably is a calendered film. As a final step in the bonding of skin to the expanded plastic, selected embossing rolls not only compress the laminations for enhanced adhesion but also impart surface contours for desired textural effects.

Figure 1:
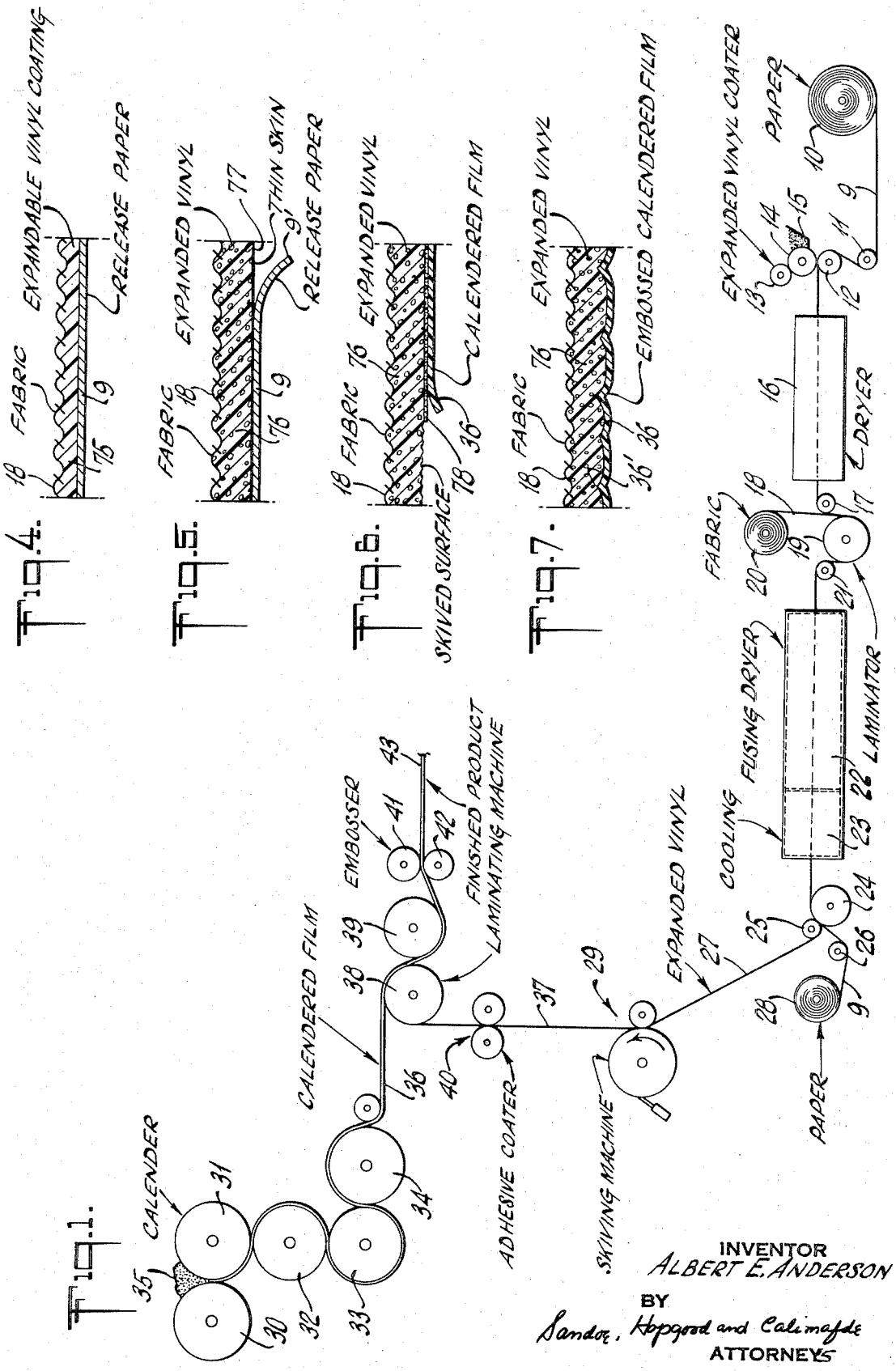
FIG. 1 is a process-flow diagram schematically illustrating steps in one embodiment of the method of the invention.

Referring to FIG. 1 of the drawings, the invention is shown in application to a continuous process for the manufacture of fabric having an expanded plastic coating with a characterized special plastic skin surface. The plastic with which the method has been used in a plastisol or organosol which may be or include ployvinyl chloride as the significant component, so that the expanded layer is expanded vinyl; the surface layer may be a vinyl skin. As indicated generally the fabric is built on an initial base of release paper 9, shown available from a supply reel or drum 10 and paid out over suitable guide-rolls 11–12 for reception of a surface coating of the basic plastisol or organosol which incorporates the expanding characteristics. In the form shown, a metering-roll 13 and an application roll 14 deliver the liquid expandable plastic from a reservoir 15 to the top surface of the release paper 9, and the roll 12 may be a rubber pressure roll forming part of the coating unit. Thus-coated, the paper is moved through a first drying oven 16. The temperature and duration of exposure within the drying oven 16 are such that upon exit from the dryer 16, at guide-roll 17, the coating on the release paper is tacky, and plastic-expansion has not proceeded to any appreciable extent. It is at this point that reinforcing fiber or fabric 18 is introduced, at laminating means 19; here the fabric 18 is squeezed between the tacky layer and the laminating roll, by compression attributable to web tension. The fabric 18 may be woven, non-woven, or knitted and is schematically indicated as being paid out from a fabric-supply reel 20.

The thus-laminated composite is then fed to a guide-roll 21 for conduct into one or more ovens or fusing dryers 22, where the expandable vinyl coating is allowed to expand and to cure in its expanded condition. In this part of the process and in the laminating process, the expandable plastic is caused to enter the voids or interstices of the reinforcing material 18 and to expand and cure in anchored relation thereto. The terminal phase of the dryer 22 is a cooling chamber 23 so that a guide-roll 24 may thereupon be utilized in conjunction with subordinate guide-rolls 25–26 to strip or separate the release paper 9 from the coated fabric, designated 27. A take-up reel 28 is shown receiving the release paper after stripping.

The stripped and coated fabric at 27 is characterized by a surface skin which follows the character of the release paper. In general, this will be smooth and slick and is therefore ill-adapted to bonding. In accordance with the invention, bonding effectiveness is materially enhanced by automatically stripping or skiving this thin skin from the coated fabric 27. A skiving mechanism is schematically indicated at 29 and will be later described in greater detail. It suffices to say that at the operation connoted by numeral 29 the smooth character of the coated plastic is eliminated and, instead, there is presented as the external surface of the coated fabric a discontinuous surface characterized by voids and pockets of the expanded vinyl itself.

According to the invention, a separate special layer is next applied to the pocked exterior of the skived expanded plastic. This may be done by directly casting liquid plastic over the pocked surface and then curing to form an exterior skin of the desired toughness and character. Preferably, however, because of greater control and saving of expense, without impairment of quality, a separate calendered film is applied and bonded as the special outer skin. Such film may be locally prepared for lamination to the skived layer.

Calendering means is shown as plural adjacent rolls 30–31–32–33–34 driven for development of calendered film therebetween. Basic plastic material for calendering is schematically indicated at 35, of color as desired in the ultimate product surface. The calendered film is continuously supplied at 36 for lamination to the skived expanded-vinyl coated material designated generally 37.

For bonding effectiveness at laminating means 38–39 adhesive is applied between the layers to be laminated; for use with expanded vinyl and calendered vinyl film, vinyl plastisol adhesive has been found highly satisfactory. In the form shown, the adhesive liquid is applied by coating roll 40 to the pocked surface of the skived sheet 37. In the laminating process the calendered film 36 is compressed against the skived surface to squeeze adhesive into the voids and pockets of the skived surface, for enhanced bonding effectiveness. Bonding action is further enhanced by squeeze rolls 41–42 at the outlet of the laminating mechanism, and these rolls 41–42, as well as the laminating rolls 38–39, are heated as necessary to assure that the plastisol adhesive will become fused and cured at the rolls 41–42. Generally speaking, particular surface textures are required or desired in the finished product and, therefore, the squeeze rolls 41–42 may be and preferably are embossing rolls. The irregularities in contour on the embossing rolls not only serve to impart the desired surface contour on the calendered film, but also to assure a plurality of localized extreme points of pressure over the entire surface area of the product, thus further assuring penetration of the adhesive into the expanded vinyl region. This further penetration of adhesive assures longevity of embossed texture and additionally assures enhanced bonding effectiveness. The finished product is designated 43 and may be rolled and cut as desired.

The foregoing description passed briefly over the reference to skiving at 29 and this will be further described in connection with FIGS. 2 and 3. Actually, it would be adequate for the purposes of one embodiment of the method to employ surface-abrading, grinding or cutting instrumentalities at 29 in order to eliminate the undesired smooth-surface skin on the expanded plastic 27. However, I have found that this skin may be removed and the desired maximum height and pocked texture of expanded vinyl coating may be more effectively achieved with heat-skiving apparatus of FIGS. 2 and 3.

Figure 2:
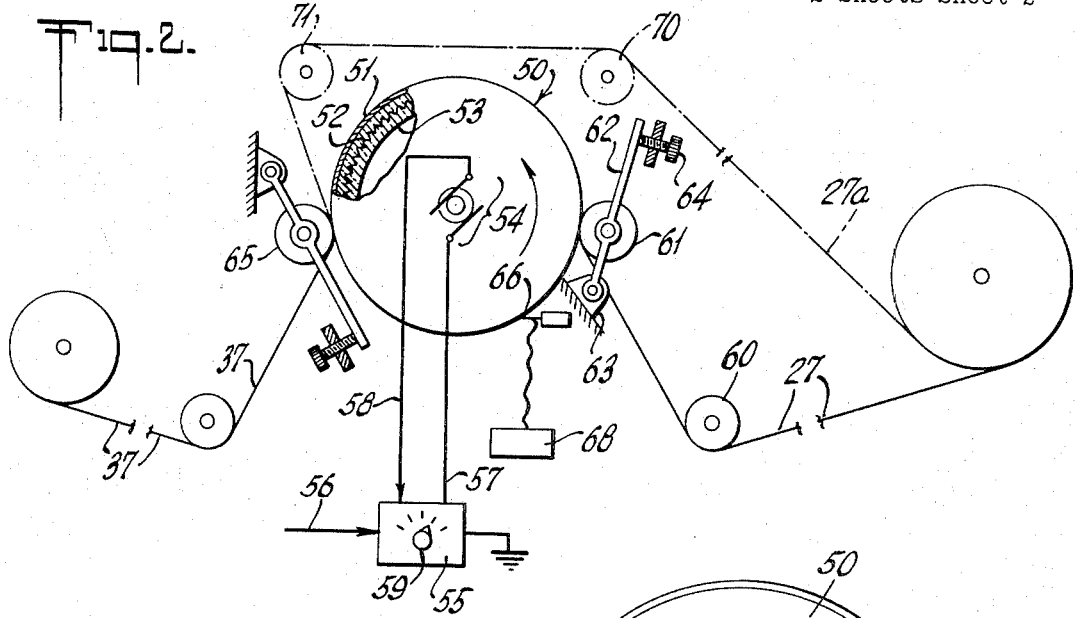
FIG. 2 is a simplified view in side elevation partly broken-away and sectioned, to illustrate certain of the apparatus used in the method of FIG. 1.

In FIG. 2, the heat-skiving mechanism is seen to comprise a cylinder or drum 50 having a highly finished surface, which may be the polished surface of a metal cylinder 51. This drum is mounted for rotation on its axis and is shown with regulated heating means, which may involve steam, circulated heated liquid or the like, but which in the specific form shown is electrical; thus, an inner surface carries electrical heating means 52, which may be embedded in suitable insulating material 53. Power supply to the heating means is suggested by slip-rings 54. A control device 55 operates from an electrical supply 56 to furnish controlled power in output line 57 to the slip-ring connection. A temperature-following (e.g., thermocouple) line 58 provides feedback, for assuring regulated supply of power in line 57; adjustment for desired temperature is suggested at 59. The coated fabric 27 is supplied over an input guide-roll 60 to the drum 50 by way of a first nip-roll 61. Roll 61 is shown mounted on a lever structure 62 pivoted to the frame at 63 and having provision at the other end, as by set-screw means 64, for adjusted compressional leading of the coated fabric 27 on the periphery of the drum 50. For the form shown, the fabric is carried around the upper part of the drum 50 with rotation of the drum 50, and it remains in such contact until stirpped after passing a second adjustable nip-roll 65. It will be understood that the adjustment mounting for roll 65 may be as described for roll 61 assuring the desired degree of compressional contact of the coated plastic at the entrance and exit locations.

The action of separating the coated fabic 37 from the drum 50 at location 65, in conjunction with the action of heat upon the surface layer of the coated fabric 27, is such as to strip the surface layer, allowing that surface layer or skin to remain as a coating on the drum 50. Further rotation of the drum 50 brings this stripped surface coating to the region of a doctor-blade 66 for scavenging, so that a clean drum surface may be presented for action upon the next length of coated fabric to be stripped of its surface skin.

Figure 3:
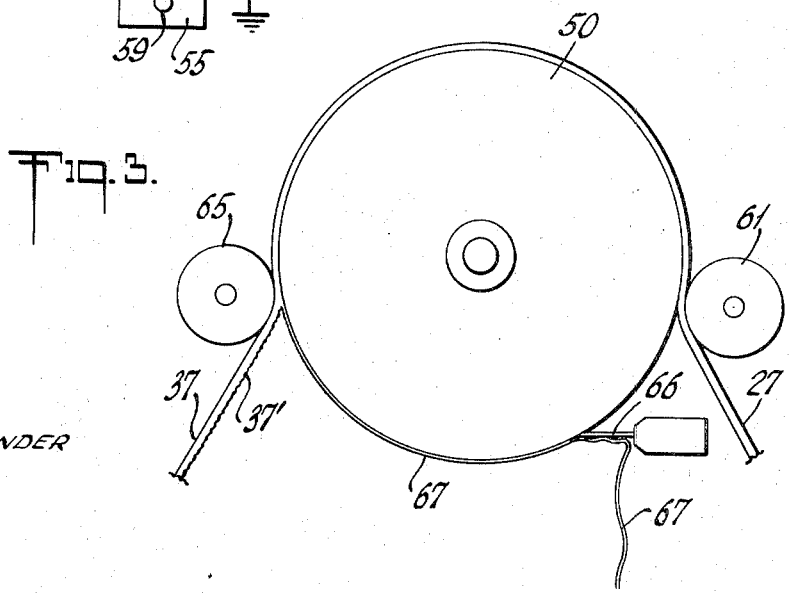
FIG. 3 is an enlarged simplified side view of parts of the apparatus of FIG. 2.

The action of the doctor-blade 66 will be better understood by refernce to FIG. 3 where the stripped skin layer 67 is more readily recognizable part from the coated fabric 37 from which it has been stripped. FIG. 3 also suggests in exaggerated fashion the roughened or pocked character of the surface 37' of the stripped coated fabric. The stripped skin may be collected and conveyed elsewhere by any suitable means, which is merely schematically indicated at 68 (FIG. 2).

It will be understood that for some particular plastic materials extended arcuate contact is most desirable for the skiving function described in connection with FIG. 2. For other plastics, limited arcuate contact of a much more transient nature may be desired. The machine of the invention lends itself to accommodation of the latter situation, by the provision of alternate threading or guide-rolls 70–71 which enable the coated plastic 27a to be supplied by a route which by-passes most of the circumference of the drum 50. In this event, merely the single nip-roll 65 will be adequate to assure the necessary stripping contact with the heated drum.

The feed rate for coated material through the skiving mechanism will necessarily depend upon the surface temperature of drum 50, the formulation of the expanded material, its density, and other factors. Typically, for the illustrative case of vinyl, the feed rate has been 50 to 55 feet per minute, for the drum 50 at about 360° F., and for the transient contact involved in use of the single nip-roll 65; for wrap-around contact, using both rolls 61–65, the temperature of drum would be reduced, as to about 340° F. Of course, for slower feed rates, such as 10–20 feet per minute, the drum temperature may be further reduced; and greater feed rates, such as 75–80 feet per minute, call for high drum-surface temperatures. It will be understood that these feed rates and temperatures may be different for various particular formulations, whether vinyl or some other plastic, and that in any event it is achievement of a correct temperature gradient in the coated fabric 27 (27a), essentially localized at the stripped skin, which localized gradient enables the thickness of stripped skin to be thus localized.

The build-up of fabric according to the invention will perhaps be better understood by reference to the simplified sectional diagrams of FIGS. 4 to 7. FIG. 4 depicts the situation in which the expandable vinyl coating 75 has been applied to the release paper 9 and has been made tacky by action of the dryer 16. At this instant, the fabric 18 is applied to the tacky surface and this is the relation of components just prior to squeezing action at the laminator 19.

In the situation depicted in FIG. 5, the action of the fusing dryer 22 has been such as to expand the plastic as indicated at 76, the fabric 18 being embedded in the surface which has been elevated by expansion action, thus raising the fabric 18 away from its original proximity to the release paper 9. A peel at 9' suggests stripping the release paper from the composite at this point, so as to expose the thin skin 77 which is to be removed by skiving action.

In FIG. 6, the skiving action has peeled the skin 77 from the expanded plastic 76, and adhesive 78 has been applied just prior to introduction of the calendered film 36, which will become the ultimate outer finished surface of the material. The composite or sandwich of FIG. 6 is passed to the laminating mechanism 38–39 and thence to the embosser 41–42.

The embossed product is illustrated in FIG. 7, wherein the calendered film 36 is seen to have indentations not only in its outer surface but also necessarily in its inner surface. This inner surface is characterized by inward projections, as at 36' extending in and bonded to the expanded plastic layer 76.

Figure 8:
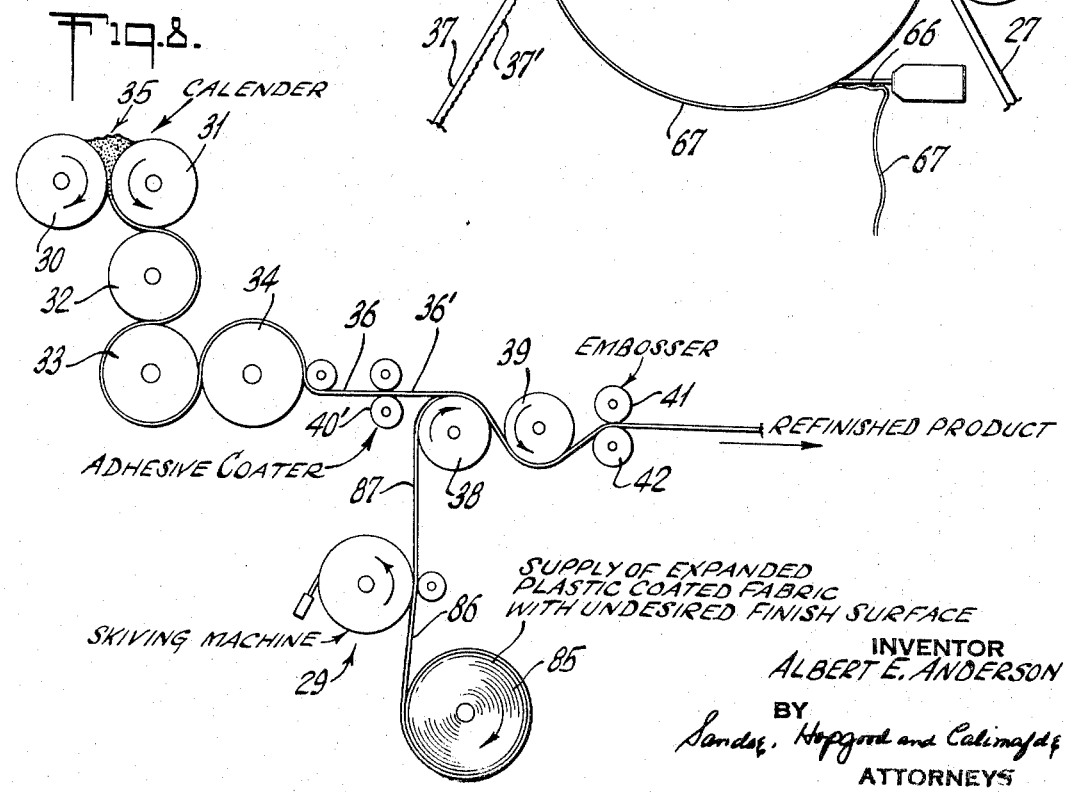
FIG. 8 is a view similar to FIG. 1 to illustrate a modification.

FIG. 8 is a view similar to FIG. 1 to illustrate a modification wherein the apparatus of the invention may be utilized to in effect reclaim a finished product which may have been finished with the wrong color or the wrong surface texture for some particular customer. Thus, a reel 85 containing a supply of expanded-plastic coated fabric with the undesired finish surface is payed out at 86 to the skiving machine 29 where, by the action of heat and stripping, the undesired surface is removed, thus exposing a region of adhesive-filled pocked character for reception of the calendered film of the new surface to be applied. In the embodiment of FIG. 8, adhesive is applied at 40' to the calendered film 36, so that coated film 36' is compressed by laminating action at 38–39 onto the skived coated fabric 87. Bonding is consolidated and texturing achieved by embossing action at 41–42, to yield the refinished product.

It will be seen that I have described methods and apparatus for producting improved plastic-coated fabrics wherein expanded plastic underlies a characterized or textured skin surface. The invention makes possible not only a tougher, better-bonded surface layer, but also rapid change-over both with regard to color pigment at 35 and with regard to texture, merely by embossing-roll substitution. The ability to refinish existing fabrics or semi-finished fabrics will be recognized as having substantial economies. For example, the expanded vinyl, once stripped of its release paper 9 may be inventoried prior to skiving at 29, relying upon the inherent thin skin 77 to preserve the expanded layer 76; there may thus be provided a basic inventory of semi-finished material which requires only skiving action to accept the desired pigmented calendered film 36 and embossing texture at 41–42. In this manner, the principal inventory is flexibly adaptable to the current demand for pigment and surface texture.

Although the invention has been described in detail for preferred forms and methods, it will be understood that modifications may be made without departing from the invention as defined in the claims which follow.

What is claimed is:

1. Skiving apparatus for removing the outer plastic skin surface from expanded plastic coated fabric having a zone of gas-expanded pockets between said skin surface and the base of the fabric, comprising a cylinder having a smooth external surface and mounted for rotation about its axis, said external cylinder surface being of a material which when heated to a predetermined degree will lightly adhere to the outer plastic skin of the coated fabric, first roll means positioned alongside the surface of said cylinder for guiding and applying a continuously moving web of expanded plastic coated fabric in contact with said cylinder over a limited arc of said cylinder, the skin surface of the expanded plastic being in direct contact with said smooth surface, means for heating the surface of said cylinder to a predetermined degree at contact with the web, whereby the full extent of said plastic skin surface may be softened and lightly adhered to said smooth surface in the course of movement with said cylinder over said arc, second roll means located at the end of said arc and in contact with the base side of the fabric for removing and thus tearing the remainder of said coated fabric from the thus-adhered skin portion thereof, said first and second roll means being the only means determining application of said fabric to said cylinder over said arc, whereby heat alone from said cylinder may pressurize gas pockets of the expanded zone of the plastic to localize plastic softening at the region of skin juncture to said pockets, thus enabling the skin to be severed by said cylinder as the remainder of said fabric is guided over the second roll, and doctor-blade means extending across a part of said cylinder beyond the location of web contact and oriented to skim the said adhered skin from the cylinder surface.

2. Apparatus according to claim 1, in which said first roll means is adjustably positionable with respect to said cylinder, for adjustable loading of the web against the cylinder surface.

3. Apparatus according to claim 1, in which said second roll means is adjustably positionable with respect to said cylinder, for adjustable selection of the fabric locating gap at which the coated-fabric remainder is removed from the adhered skin.

References Cited
UNITED STATES PATENTS

| | | | |
|---|---|---|---|
| 1,042,129 | 10/1912 | Leisel | 156—389 |
| 3,554,824 | 1/1971 | Callahan | 161—96 |
| 2,624,068 | 1/1953 | Dobry | 156—389 |
| 1,763,099 | 6/1930 | Mead | 156—254 |

WILLIAM J. VAN BALEN, Primary Examiner

J. J. BELL, Assistant Examiner

U.S. Cl. X.R.

156—209, 220, 254, 344, 510, 549, 584; 161—119, 160, 406